United States Patent [11] 3,578,940

| [72] | Inventor | Oran J. Sands |
| | | Columbus, Ind. |
| [21] | Appl. No. | 801,065 |
| [22] | Filed | Feb. 20, 1969 |
| [45] | Patented | May 18, 1971 |
| [73] | Assignee | Arvin Industries, Inc. |
| | | Columbus, Ind. |

[54] WELDING PROCESS
2 Claims, 4 Drawing Figs.

| [52] | U.S. Cl. | 219/91 |
| [51] | Int. Cl. | B23k 9/28, |
| | | B23k 11/10 |
| [50] | Field of Search | 219/117, |
| | | 91, 78, 92, 85, 56 |

[56] References Cited
UNITED STATES PATENTS

| 3,353,263 | 11/1967 | Helms | 219/85X |
| 3,155,809 | 11/1964 | Griswold | 219/86 |
| 3,263,059 | 7/1966 | Rzant | 219/56X |
| 3,337,711 | 8/1967 | Garscia | 219/92 |
| 3,418,444 | 12/1968 | Ruehlemann | 219/78X |

FOREIGN PATENTS

| 697,396 | 9/1953 | Great Britain | 219/92 |
| 1,018,622 | 1/1966 | Great Britain | 219/91 |

*Primary Examiner*—J. V. Truhe
*Assistant Examiner*—Hugh D. Jaeger
*Attorney*—Trask, Jenkins & Hanley ABSTRACT: A welding apparatus and method for spot welding a first metal workpiece having a plastic-covered surface to a second metal workpiece. The two workpieces are placed in metal-to-metal engagement and clamped between the electrodes of two aligned welding guns, a first electrode engaging the plastic surface of the first workpiece and a second electrode engaging the second workpiece. At a point spaced from the second electrode, the metal of the second workpiece is engaged by a contact member between which and the second electrode an electric current can flow through the metal. The second electrode is connected to one terminal of a welding-current source the other terminal of which is connectable through appropriate switch means alternatively to the contact member or to the first electrode. With the contact member connected to the current source heat generated by current flow through the metal of the workpieces softens the plastic to enable the first electrode to penetrate it and engage the metal substrate. Thereupon, the switch means is operated to disconnect the contact member from the power source and connect the first electrode thereto, thus permitting welding current to flow between the two electrodes through the metal. A timing mechanism is provided to control automatically the supply of current and the operation of the welding guns and switch means.

Patented May 18, 1971

INVENTOR
ORAN J. SANDS
BY
ATTORNEY

INVENTOR
ORAN J. SANDS
BY
ATTORNEY

WELDING PROCESS

BACKGROUND OF THE INVENTION

In spot welding a plastic-clad metal workpiece to another metal workpiece it has been customary to clamp the two workpieces together in metal-to-metal contact between the electrodes of two welding guns, with the first of such electrodes engaging the plastic on one workpiece, the second electrode engaging the metal on the other workpiece and a third electrode engaging the one workpiece at a point spaced from the first and second electrodes. In such an arrangement, the first and third electrodes are connected together and to one side of a power source. The second electrode is connected to the other side of the power source and a current is conducted between the second and third electrodes to heat and soften the vinyl so that the first electrode can puncture the vinyl and come into direct contact with the first workpiece. However, when the one electrode breaks through the plastic and engages the metal there is substantial arcing which produces a rough weld having sharp metal burrs and containing contaminants from the electrode tip.

It is therefore an object of the invention to provide a method and apparatus which will overcome such disadvantages.

SUMMARY OF THE INVENTION

In practicing the present invention, a plastic-clad metal workpiece is clamped to a metal workpiece, preferably in metal-to-metal contact. A first welding gun has its electrode brought into contact with the plastic and a second welding gun has its electrode brought into contact with the metal workpiece with the two electrodes disposed in alignment with each other. A contact member is also placed in contact with the metal workpiece in spaced relation to said second gun. The second gun is connected to one terminal of a weld-current source, and said first gun and contact member are connected to a switch means which enables them to be connected alternatively to the other terminal of said weld-current source. A timing circuit is connected to the switch means and current source, which timing circuit when actuated, automatically controls the current source, welding guns and contact member, and switch means.

To start the welding operation, the electrode on the second gun and the contact member are connected across the current source whereby a current flowing between them through the metal in the direction in which the lamina extends will generate in the metal sufficient heat to soften the plastic under the electrode of the first gun. This permits the electrode of the first gun, under its clamping pressure, to penetrate the plastic and establish contact with the metal lamina. Upon completion of this first heating cycle, the contact member is disconnected from the current source and the first gun is connected thereto by operation of the switch means to provide a second heating cycle which effects the desired spot weld. If both workpieces are plastic clad, the pressure from the electrodes will puncture the plastic after a heating current is passed through the workpieces, but it will be necessary to use an additional contact member in the heating current circuit if both electrodes are pressed against plastic-clad surfaces of the workpieces.

DESCRIPTION OF THE DRAWING

The accompanying drawing illustrates the invention. In such drawing.

DESCRIPTION OF THE PREFERRED EMBODIMENT

Figure 1:
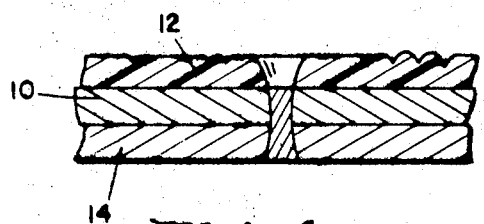
FIG. 1 is an enlarged sectional view of a finished workpiece welded according to the invention.
Figure 2:
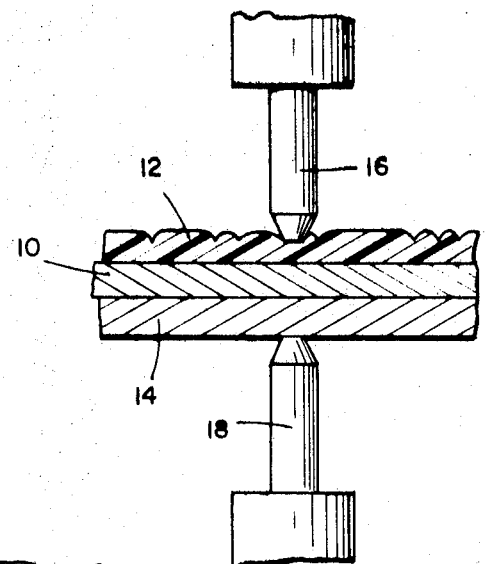
FIG. 2 and 3 are enlarged sectional views of the workpiece shown in FIG. 1, showing successive steps in the operation of the welding apparatus.
Figure 3:
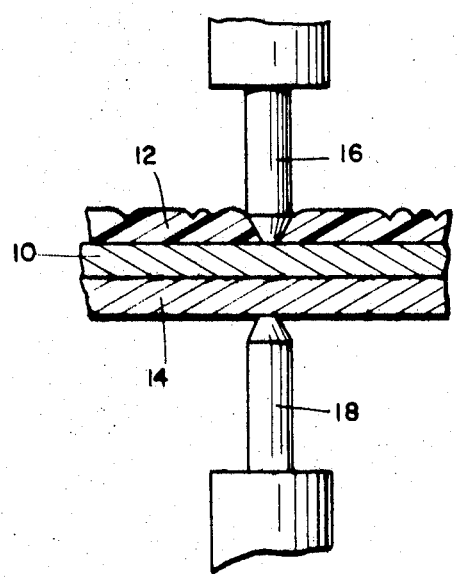

As will be clear from the drawing, the operation to be performed in practicing this invention is the spot welding of a metal sheet 10 or other workpiece, covered on one side by a plastic lamina 12, to a bracket or like workpiece 14. The illustrated apparatus for forming the spot weld includes the aligned electrodes 16 and 18 of two pneumatically operated spot-welding guns having air cylinders 22 and 24. The work to be welded is placed between the electrodes with the plastic lamina 12 facing the electrode 16 and bracket 14 facing the electrode 18. On the same side of the work as the electrode 18 is a contact member 20 adapted to be brought into engagement with the bracket 14 at a point spaced from the electrode 18. In the illustrated embodiment, the cylinders 21, 22, and 24 are connected to inlet lines 25 for moving their respective electrodes and contact members into engagement with the workpieces and to outlet lines 26 for moving said electrodes and contact member away from the workpieces. The lines 25 and 26 are connected to a source of air pressure (not shown) through a valve 27 whose operation will be more fully described hereinafter.

Current for the welding operation is supplied by a transformer 28 one output terminal of which is connected by a line 29 to the welding electrode 18. The other output terminal of the transformer is adapted to be connected alternatively to either welding electrode 16 or to the contact member 20 by a switch means 30. Because of the high current to be transmitted, an ordinary relay is unsuited for use as such a switch means, and I therefore prefer to use a pneumatically operated switch comprising an air cylinder 32, a movable contact 34 and two fixed contacts 36 and 38. The movable contact 34 is movable by the air cylinder 32 into alternative engagement with the fixed contacts 36 and 38. The fixed contact 38 is connected to the electrode 16 by a line 40, the other fixed contact 36 to the contact member 20 by a line 42, and the movable contact 34 to the other terminal of the transformer 28 by a conductor 44. The cylinder 32 is connected by inlet and outlet lines 45 and 46 to a source of air under pressure (not shown) through a valve 47 whose operation will be more fully described hereinafter.

The transformer is connected by lines 49 and 50 to a welding power supply 51 connected to a source of AC current by lines 53 and 54 and actuated by a time control 52. The timer control includes a timing resistor 56 and a normally open switch 58 one side of which is connected to the line 54. The other side of the switch 58 is connected to the line 53 through a par of lines 60 and 61 connected to a solenoid 62 for controlling the valve 27. As shown, the solenoid 62 is also connected by lines 64 and 65 to a stepping relay 68 actuating a first switch 69 having a blade 70 and contacts 71 and 72 and a second switch 73 having a blade 74 and contacts 75 and 76. The blade 70 and its contact 72 are connected by lines 77 and 78 to a pushbutton switch 80 which is connected by the lines 81 and 82 to the timer control 52 so that upon momentary closing of the switch 80 the welding cycle will be initiated.

The switch blade 74 is connected by line 85 to one side of an AC power source with the other side of said power source being connected by line 86 to one side of a solenoid 88 for controlling the valve 47. The opposite side of the solenoid 88 is connected by line 89 to the contact 76. As shown, one side of a relay 90 is connected by line 92 to the line 86, and the opposite side of said relay is connected by line 94 to the contact 76. The relay 90 controls a switch 95 having a blade 96 connected by a line 102 to the timing resistor 56, a first contact 97 connected by line 98 to one side of a potentiometer 100 whose opposite side is connected to said timing resistor by line 104, and a second contact 101 connected to the line 104.

Figure 4:
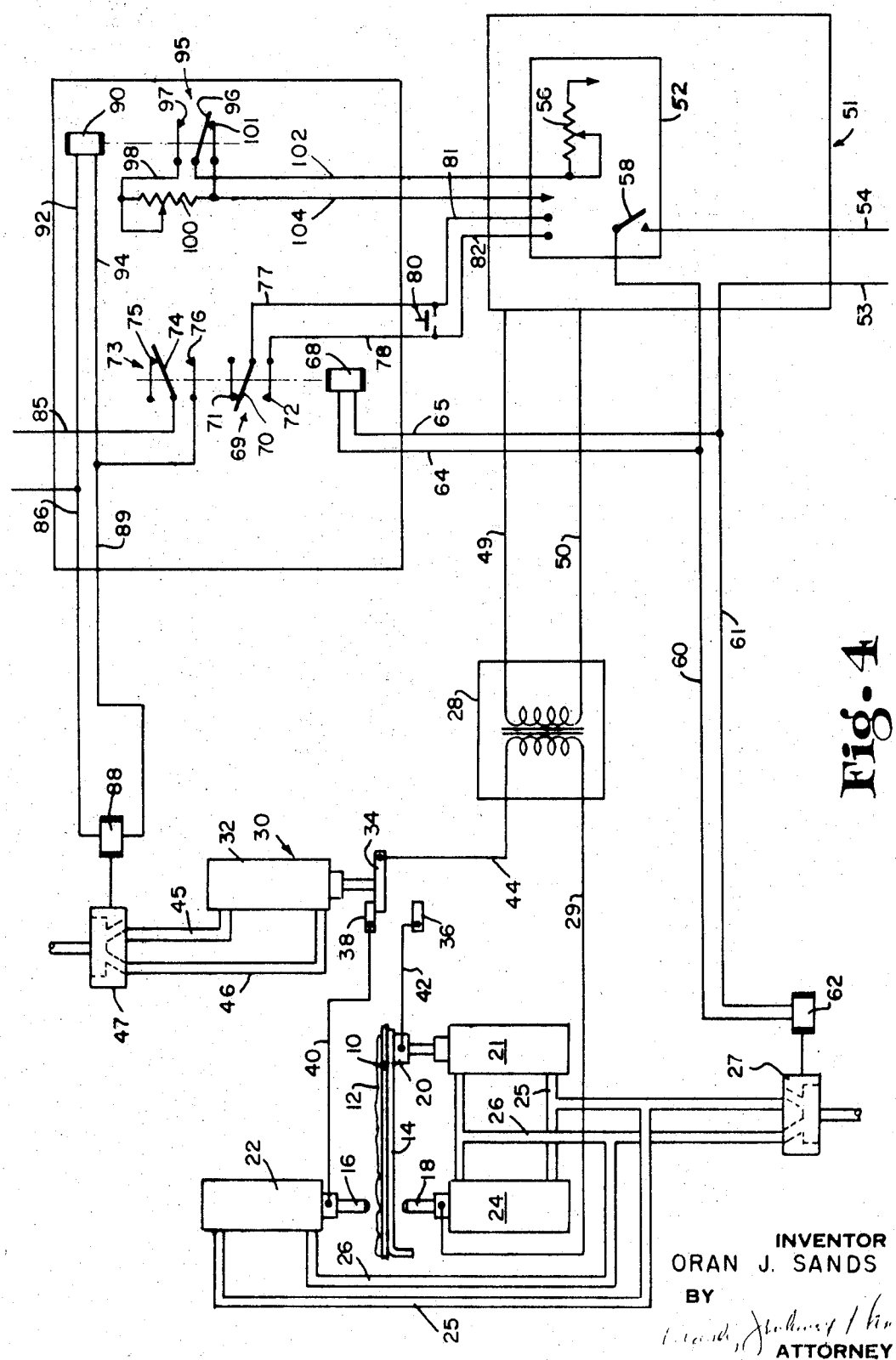
FIG. 4 is a diagrammatic illustration of a welding apparatus showing the work inserted therein.

Thus, in operation of the apparatus shown in FIG. 4, the switch 80 is closed to actuate the timing resistor 56 for closing the switch 58 whereupon the solenoid 62 is actuated to cause valve 27 to move into a position to permit the cylinders 21, 22, and 24 to move the electrode 18 and contact member 20 into engagement with the workpiece 14 and the electrode 16 into engagement with the workpiece 10. Momentary closing of the switch 80 also causes the stepping relay 68 to close switches 69 and 73 against their contacts 72 and 76 to energize solenoid 88, thereby positioning valve 47 to cause the cylinder 30 to close the movable contact 34 against fixed contact 36. With switch 73 closed against its contact 76, the relay 90 will also close switch 95 against its contact 97 to connect the potentiometer 100 to the timing resistor 56. Thus, as a result of this sequence, a welding circuit is established through the transformer 28 and the electrode 18 and contact member 20 to heat the workpieces 10 and 14. This causes the plastic layer 12 to soften so that the electrode 16 under the pressure from cylinder 22 penetrates said layer into engagement with the adjacent metal surface of workpiece 10.

The time interval of this first cycle is controlled by the timing resistor 56 and potentiometer 100. By adjusting the potentiometer, different time intervals for the first cycle can be employed depending upon the character and thickness of the plastic covering 12. Upon completion of the first cycle, the timing resistor 56 opens switch 58, but the stepping relay 68 retains switches 69 and 73 closed against contacts 72 and 76 so that said timing circuit is reactuated for the second welding cycle even though switch 80 is open. Reactuation of the timing resistor 56 recloses switch 58 to reenergize solenoid 62 to cause cylinders 21, 22, and 24 to force the electrodes 16 and 18 an contact member 20 against the workpieces. The opening of switch 58 between the cycles will have caused the solenoid 62 to have disengaged said electrodes and contact members from said workpieces but this will have been only a momentary condition between the two cycles.

Upon the reclosing of switch 58, the stepping relay 68 will move the switches 69 and 73 to close against contacts 71 and 75 to deenergize solenoid 88 and thereby permit valve 47 to be positioned such that the cylinder 32 will close the contact 34 against contact 38 to connect the electrode 16 to the transformer. Thus, the welding circuit is completed through the electrodes 16 and 18 to pass a current through the workpieces 10 and 14 perpendicular to the plane of their abutting faces for welding them together. With the switches 69 and 73 closed against their contacts 71 and 75, the relay 90 will also be deenergized and switch 95 will close against its contact 101 to disconnect the potentiometer 100 from the timing resistor 56. The potentiometer 100 being connected in series with the timing resistor 56 permits the duration of the second weld cycle to be controlled solely by the resistor 56 independently of the duration of the first cycle.

When the second cycle is completed, the timing resistor 56 will again open the switch 58 thereby deenergizing the solenoid 62 to position the valve 27 such that the cylinders 21, 22, and 24 will be drawn away from the workpieces. A new set of workpieces can then be positioned between the electrodes 16 and 18 and contact member 20 and the welding cycles can be initiated on the new workpieces by reclosing the switch 80.

While the contact member 20 has been shown as engaging the workpiece 14 during the first cycle, it is to be understood, however, that said member can engage the metal face of the workpiece 10 during such first cycle.

I claim:

1. A method of spot welding a metal workpiece to the surface of a second metal workpiece, wherein at least one of said workpieces has one of its sides covered with a thermoplastic coating, comprising the steps of softening said coating at the weld site by heat generated by a first electric current flowing from a current source through a first welding electrode and a contact member and at least one of the workpieces in a direction generally perpendicular to the thickness of the workpieces, said first electrode and contact member being in engagement with a metal surface of at least one of said workpieces, forcing a second welding electrode against coating on the workpieces, not engaged by said first electrode, at the desired location of the weld while said coating is in a softened state, thereby puncturing the plastic coating and disposing both of said electrodes in contact with the metal surfaces of said workpieces, and then causing a second electric current from said current source to flow between said electrodes and through the two workpieces in the direction of their thicknesses, said second electric current not being initiated until the flow of said first current is terminated and said second electrode being disconnected from the current source during its penetration of said coating.

2. A method of spot welding a metal workpiece to the bare metal surface of another metal workpiece whose opposite surface is covered with a thermoplastic coating, comprising the steps of moving a first and second electrode into alignment with each other and into bearing contact with said coating and metal workpiece, moving a contact member into contact with one of said metal workpiece and another workpiece, softening said coating interposed between said first and second electrodes by heat generated by a first electric current flowing from a current source through said second electrode and contact member, forcing said first electrode through said coating to form an opening therein while said coating is in a softened state and to dispose said first electrode in contact with the metal of said another workpiece, and after said first electrode is in contact with the metal of said another workpiece causing a second electric current to flow from said current source between said first and second electrodes through the two workpieces to weld said workpieces together.